Sept. 23, 1958 — W. DROST ET AL — 2,852,890
SYNTHETIC UNICRYSTALLINE BODIES
AND METHODS FOR MAKING SAME
Filed Aug. 12, 1955

INVENTORS
WILFRED DROST
RICHARD W. KEBLER
BY Thomas J. O'Brien
ATTORNEY

Sept. 23, 1958     W. DROST ET AL     2,852,890
SYNTHETIC UNICRYSTALLINE BODIES
AND METHODS FOR MAKING SAME Filed Aug. 12, 1955     2 Sheets-Sheet 2

INVENTORS
WILFRED DROST
RICHARD W. KEBLER
BY Thomas O'Brien
ATTORNEY 2,852,890

SYNTHETIC UNICRYSTALLINE BODIES AND METHODS FOR MAKING SAME

Wilfred Drost, Williamsville, N. Y., and Richard W. Kebler, Speedway, Ind., assignors to Union Carbide Corporation, a corporation of New York Application August 12, 1955, Serial No. 527,992

10 Claims. (Cl. 49—77)

This invention concerns improved synthetic unicrystalline bodies, for example, unicrystalline corundum bodies, and improved methods of producing such bodies.

Sapphire or corundum and other gem materials possess certain properties which render them especially valuable for many purposes in addition to their value for ornamentation. The chemical inertness and mechanical strength and hardness of sapphire make this substance particularly suited for certain types of optical work, and its capacity for infra-red transmission, together with the above-mentioned properties, makes it highly desirable in infra-red systems. For example, thin disks of sapphire can be fabricated into polished plates which serve as excellent windows for high temperature furnaces. For many years now there has been a particular need for larger diameter synthetic unicrystalline bodies for such uses than those which can be made available by known processes.

Synthetic sapphire and other materials, such as rutile and spinel, are generally produced from boules grown by fusing and accumulating an appropriate material on a support which underlies an oxy-hydrogen flame and is progressively moved away from such flame as the boule grows in order to maintain a proper relationship between the upper surface of the boule and the flame. As obtained by this process, which is well-known as the Verneuil process, the boule is generally cylindrical in form and usually not more than one inch in diameter. Although boules may be grown in this manner which approach or even somewhat exceed one inch, such boules rupture during shutdown of the furnace and are rendered unfit for the fabrication of large diameter discs. Such rupture is believed to result from the superposition of the thermal stresses undergone during cooling upon the stresses resulting from the thermal gradients in the boule during growth. The larger the boule diameter, the greater the combined stresses. Consequently, synthetic unicrystalline disks heretofore available commonly had to be cut from these small diameter boules and did not exceed about ⅞" in diameter.

It is therefore the purpose of this invention to provide an improvement on the Verneuil process for growing synthetic gem bodies which overcomes the restrictive size and shape limitations in known growing methods and which enables boules to be grown in forms which could not be produced by prior art processes.

A specific object of this invention is to provide an improved process for growing a crystalline body by fusing and accumulating the constituents of such a body, which embodies new techniques that substantially reduce the temperature gradient across the boule during growth and render thermal stresses during cooling less dependent upon the diameter of the boule.

Another object is to provide a method of growing unicrystalline sapphire boules in the form of enlarged diameter discs.

According to the present invention, powdered constituents of the crystal to be formed are passed through an oxy-hydrogen flame to fuse the constituents. The fused constituents are accumulated and crystallized on a rod which has compatible lattice parameters and the same crystal structure. The rod is rotated about an axis substantially normal to the direction of the flame, so as to form a radially enlarging crystal of increasing diameter. The rate of rotation of the rod is fast enough to bring each point of the outer edge of the boule back under the flame while it is still molten. The resulting boule is approximately circular in cross section and may be made either in the form of a disk, by holding the rod support, the so-called "seed rod," axially stationary, or in various other configurations by imparting a predetermined reciprocatory movement to the seed rod. By rotating the seed rod, the center of the boule becomes the coldest point of the boule during growing, for every point along the peripheral edge of the boule is being constantly brought under the flame at regular periods. In this way the temperature gradient across the boule during growing is much lower than that which occurs in a comparable size boule grown according to prior methods.

The principles of the invention will be described in detail hereinafter with reference to the accompanying drawings wherein.

Figure 1:
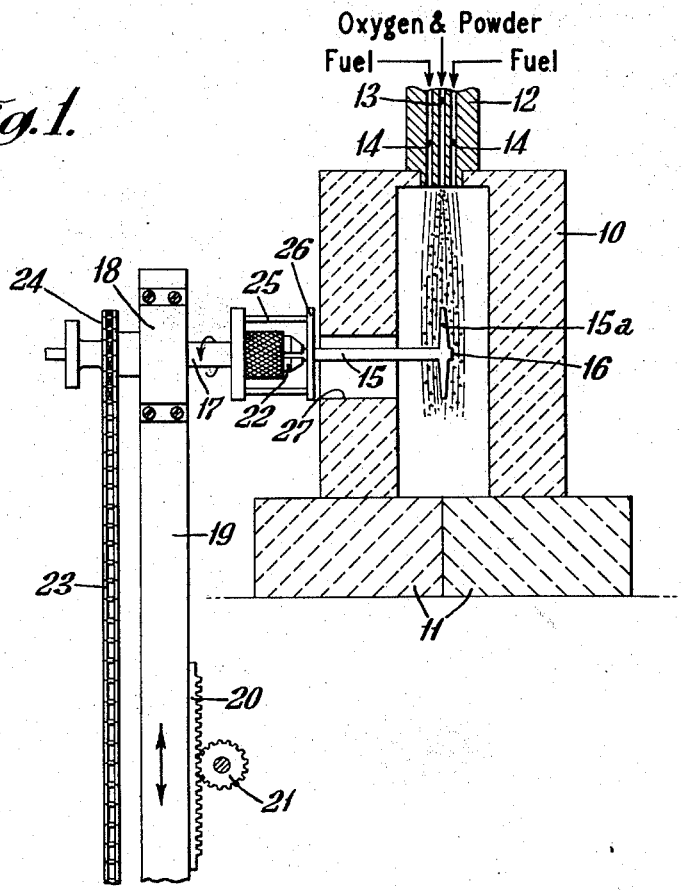
Figure 1 is a schematic view, partly in vertical section and partly in elevation, of one form of apparatus for carrying out the process of the invention.

With reference now to Figure 1 of the drawings, there is shown a small furnace 10 of heat-resistant material, which rests on blocks 11 of like material that close the lower end of the furnace. An opening in the upper end of the furnace receives the nozzle end of an oxy-hydrogen burner 12. The burner 12 is of conventional construction and operation and may be, for example, of the construction of the burner disclosed in U. S. Patent 2,634,554. Oxygen is supplied continuously through central passage 13, and powdered material, such as crystallizable corundum powder, for example, is delivered in known manner through passage 13 by the oxygen stream. Fuel gas, such as hydrogen, is delivered to the nozzle end of burner 12 through a plurality of passages 14 surrounding central passage 13. The oxygen and hydrogen mix together outside the burner and upon ignition form an intensely hot downwardly directed flame which melts the powder passing therethrough.

In accordance with the principles of this invention, a seed rod 15, which is an elongated monocrystal of the same crystal structure as the boule to be grown, and has compatible lattice parameters, is mounted for rotation about a horizontal axis in such a manner that its free end extends through an opening 27 in the side wall of furnace 10 with its tip 16 disposed in a position underlying the flame emanating from burner 12, the seed rod holder assembly being movable vertically so that as the diameter of the boule increases, the rod can be moved progressively downward to maintain a proper distance between the outer edge of the boule and the burner nozzle. Conversely, it can be readily seen that the burner may be moved relative to the seed rod, and that any relative movement of the two elements may be made to effect the desired condition.

The seed holder assembly comprises a hollow shaft 17 supported in a vertically movable guide or bearing housing 18, which may be supported, for example, on an upright 19 that has a rack 20 secured thereto which is driven by a pinion 21. The seed rod 15 extends through the hollow shaft 17 and a chuck 22 which is fixed to the shaft and holds the rod fixed relative to the shaft so that it is rotated therewith. Shaft 17 is driven by a power operated chain 23 which passes over a sprocket 24 fixed on the shaft. A yoke 25 carried by the shaft supports a radiation shield 26 which is positioned directly in front of the opening 27 in the side wall of the furnace. A special advantage of the present invention lies in the relatively simple control over heat losses as compared to prior art furnaces. Here, the furnace bottom is closed permanently, thus avoiding updrafts, and heat leak through the side wall opening admitting the seed rod is minimized by the radiation shield 26.

After an initial period of operation during which the flame is used only to fuse the surface of the seed rod, the powder feed is started. The powder dropping through the flame melts and accumulates in molten condition on the seed crystal and crystallizes progressively as the operation is continued. Rotation of the seed rod causes a disk-like boule crystal 15a to be formed. As the boule grows radially outwardly from the seed rod, the latter is lowered to compensate for such growth in order to maintain a proper relationship between the molten edge of the crystal where deposition occurs and the flame. When the seed rod is held stationary in the direction of its longitudinal axis, as in Fig. 1, the boule is grown in the form of a disk. The grown boules are subsequently annealed by slow heating to about 1900° C. in a gas-fired furnace. The boule is held at this temperature for several hours and is then slowly cooled.

Commercially satisfactory sapphire boule; i. e., boules that contain no powder layers and that do not crack during cooling, have been grown by the present process with diameters three and four times the size of the largest commercial boules heretofore available. In making enlarged boules in this manner, it has been found necessary to maintain the rotational speed of the seed rod above a limiting rate. For example, when making boules over about one inch in diameter, it was found necessary to rotate the seed rod at a rate greater than 60 R. P. M. A rotational speed of about 135 R. P. M. is preferred for boules exceeding one inch in diameter. It appears that elevated rotational speeds are necessary in growing enlarged diameter boules so that the molten layer on the outer periphery of the boule will not solidify during the time it is not directly under the flame.

Figure 2:
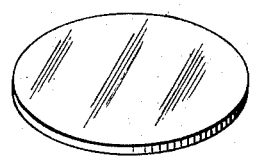
Figure 2 is an enlarged perspective view of a portion of a finished, polished disk made from a disk boule grown by the process of this invention.

Synthetic gem boules in the condition as grown in the manner described above can be of various shapes and sizes. Relatively thin disk boules can be grown by holding the seed rod stationary in the direction of its axis. Such disks are especially suitable as the raw material for windows and other optical elements, for it requires a minimum amount of saw cutting or grinding to fabricate such disks into finished plates, such as shown in Fig. 2, and it does not involve an appreciable waste of material. Thicker disks can be grown by reciprocating the seed rod along its own axis, as indicated schematically in Figure 3. The shape of these thicker disks is determined by the characteristics of the seed rod reciprocation. For example, the amplitude of the reciprocation can be changed to vary the thickness of the boule, and pattern of the reciprocation can be selected to give a desired residence time in the zone of deposition for each part of the rod passing under the flame. In this way various boule shapes, such as those shown in Figures 4 to 7 may be obtained.

Figure 3:
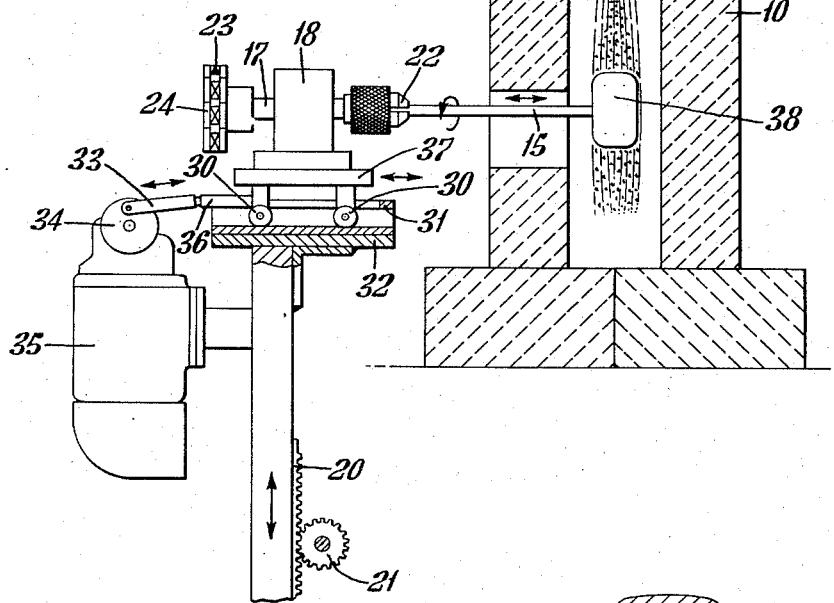
Figure 3 is a schematic illustration of boule growing apparatus, which imparts both a rotary and reciprocatory motion to the seed rod.
Figure 4:
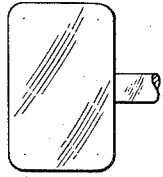
Figures 4 to 7 inclusive, illustrate several boule shapes that can be made with variation of the seed rod motion shown in Figure 3.
Figure 5:
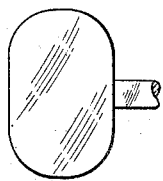
Figure 6:
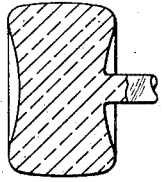
Figure 7:
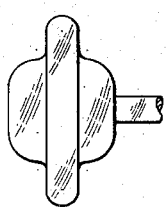

The apparatus of Figure 3 may be briefly described as follows:

Parts similar to those of Figure 1 are indicated by similar reference numbers. The principal difference between Figure 3 and Figure 1 is in the seed rod mounting which enables the operator to impart not only a rotary and vertical motion to the seed rod 15, in the same manner as described in Figure 1, but also enables him to impart a reciprocatory motion in the direction of the longitudinal axis of the seed to vary the thickness and shape of the boule. Here the seed rod bearing housing 18 is slidably supported by runners 30 in a groove track 31 carried on a platform 32. The bearing housing 18 is reciprocated by a motor 35 that is connected to such housing through the wheel 34 driven by the motor and a connecting rod 33 mounted at one end eccentrically on the wheel 34 and pivotally connected at its other end to a rod 36 fixed to a carriage 37 supporting the bearing housing 18 on the runners 30. It is believed that the operation of this embodiment is self-evident.

The crystallographic orientation of a crystal grown with the use of a rotating seed rod is a continuation of the crystallographic orientation of the seed rod, and can therefore be preselected by proper choice of the seed rod. For many purposes, it is desirable to grow the crystal with a given crystallographic orientation. For example, in many optical applications, it is desirable to have the crystallographic C-axis perpendicular to the boule axis. In such a case, a seed rod having a crystallographic C-axis orientation of ninety degrees is employed, i. e. the C-axis of the rod crystal is perpendicular to geometric axis of the rod.

In a specific example, a 2¼ inch diameter sapphire disk is grown using a 60° seed rod having a diameter of approximately 0.200 inch. The initial gas flows were 40 cubic feet per hour of oxygen and 110 cubic feet per hour of hydrogen. After the seed surface is fused, the powder feed is started. Several minutes later, the gas flows are gradually changed to 45 cubic feet per hour of oxygen and 110 cubic feet per hour of hydrogen. The powder feed rate is not varied during growth, and an average growth rate of 150 to 200 carats per hour is maintained. The disk is grown in about 2½ hours.

The method of this invention is applicable to other materials where elongated seed rods can be grown or where a seed crystal can be held on the end of a rotating rod of different material. For example, such materials as rutile and spinel may be grown by the method of this invention.

It is to be understood that the new features of process operation herein disclosed may be employed in ways and forms different from those of the preferred embodiment without departing from the spirit and scope of the appended claims.

What is claimed is:

1. A process for growing a synthetic unicrystalline body which comprises passing powdered constituent material through a flame to fuse the same; directing said flame toward a seed crystal disposed on an axis substantially normal to the flame for depositing fused material and building up such material by crystallization on said seed crystal; rotating said seed crystal about said axis at a rate fast enough to bring each point on the outer edge of the crystal back under the flame while it is still molten, so as to grow a radially outwardly enlarging crystal of increasing diameter; and varying the distance between the flame and said axis as the crystal grows to maintain a predetermined relationship between the flame and the molten edge of the crystal at the point of deposition.

2. A process as defined in claim 1 wherein said seed crystal has a crystal structure which is the same as said powdered constituent material and lattice parameters compatible with those of one constituent material.

3. A process for growing a synthetic unicrystalline body which comprises passing powdered constituent material through a flame to fuse the same; directing said flame toward a seed rod disposed substantially normal to the flame for depositing fused material and building up such material by crystallization on said seed rod; rotating said seed rod about its geometric axis at a rate fast enough to bring each point on the outer edge of the crystal back under the flame while it is still molten, so as to grow a radially outwardly enlarging crystal of increasing diameter; and varying the distance between the flame and the seed rod axis as the crystal grows to maintain a predetermined relationship between the flame and the molten edge of the crystal at the point of deposition.

4. A process for growing a synthetic unicrystalline sapphire body which comprises passing powdered crystallizable corundum through a flame to fuse the same, directing said flame vertically downward toward a horizontally disposed seed rod for depositing fused corundum on a pre-fused transverse section of the rod and building up the unicrystalline sapphire body by crystallization on said seed rod, rotating said seed rod about its horizontal axis at a rate fast enough to bring each point on the outer edge of the crystal back under the flame while it is still molten, so as to grow a radially outwardly enlarging crystal of increasing diameter, and varying the distance between the flame and the seed rod axis as the crystal grows so as to maintain a predetermined relationship between the flame and the molten edge of the crystal at the point of deposition.

5. A process as defined in claim 4 wherein said seed rod is held axially stationary during rotation so as to form a sapphire disk.

6. A process as defined in claim 4 wherein said seed rod is rotated at an order of 135 R. P. M.

7. A process for growing a synthetic unicrystalline body which comprises passing powdered constituent material through the flame to fuse the same; directing said flame toward a seed rod disposed substantially normal to the flame for depositing fused material and building up such material by crystallization on said seed rod; rotating said seed rod about its geometric axis at a speed of rotation not less than about 60 R. P. M. to grow a radially outwardly enlarging crystal of increasing diameter; and varying the distance between the flame and the seed rod axis as the crystal grows so as to maintain a predetermined relationship between the flame and the molten edge of the crystal at the point of deposition.

8. A process for growing a synthetic unicrystalline body which comprises passing powdered constituent material through a flame to fuse the same, directing said flame toward a seed rod disposed substantially normal to the flame for depositing fused material on a pre-fused transverse section of the rod and building up such material by crystallizing on said seed rod, rotating said seed rod about its geometric axis at a rate fast enough to bring each point on the outer edge of the crystal back under the flame while it is still molten, so as to grow a radially outwardly enlarging crystal of increasing diameter, regulating the thickness of the crystal by reciprocating said rod along its geometric axis so as to determine the length of transverse section of the rod passing under the flame, and varying the distance between the flame and the seed rod axis as the crystal grows so as to maintain a predetermined relationship between the flame and the molten edge of the crystal at the point of deposition.

9. A process for growing a synthetic unicrystalline body which comprises passing powdered constituent material through a flame to fuse the same, directing said flame toward a seed rod disposed substantially normal to the flame for depositing fused material on a pre-fused transverse section of the rod and building up such material by crystallizing on said seed rod, rotating said seed rod about its geometric axis at a rate fast enough to bring each point on the outer edge of the crystal back under the flame while it is still molten, so as to grow a radially outwardly enlarging crystal of increasing diameter, regulating the thickness of the crystal by reciprocating said rod along its geometric axis so as to determine the length of transverse section of the rod passing under the flame, imparting desired shapes to the crystal by controlling the reciprocation of the seed rod to give a preselected residence time in the zone of deposition for each portion of said transverse section, and varying the distance between the flame and the seed rod axis as the crystal grows so as to maintain a predetermined relationship between the flame and the molten edge of the crystal at the point of deposition.

10. A process for growing a synthetic unicrystalline body which comprises passing powdered constituent material through a flame to fuse the same; directing said flame toward a seed crystal disposed on an axis substantially normal to the flame for depositing fused material and building up such material by crystallization on said seed crystal; rotating said seed crystal about said axis at a rate fast enough to bring each point on the outer edge of the crystal back under the flame while it is still molten so as to grow a radially outwardly enlarging crystal of increasing diameter.

References Cited in the file of this patent

UNITED STATES PATENTS

| 1,004,505 | Verneuil | Sept. 26, 1911 |
| 2,703,296 | Teal | Mar. 1, 1955 |
| 2,743,200 | Honnoy | Apr. 24, 1956 |

FOREIGN PATENTS

| 512,461 | Belgium | July 15, 1952 |
| 727,678 | Great Britain | Apr. 6, 1955 |